United States Patent [19]
Miles

[11] Patent Number: 5,517,304
[45] Date of Patent: May 14, 1996

[54] DITHER GENERATION FOR RING LASER GYROSCOPES

[75] Inventor: Dennis J. Miles, Hampshire, England

[73] Assignee: The Secretary of State for Defence in Her Britannic Majesty's Government of the United Kingdom of Great Britain and Northern Ireland, London, England

[21] Appl. No.: 182,043

[22] PCT Filed: Jul. 9, 1992

[86] PCT No.: PCT/GB92/01243

§ 371 Date: Jun. 30, 1994

§ 102(e) Date: Jun. 30, 1994

[87] PCT Pub. No.: WO93/02338

PCT Pub. Date: Feb. 4, 1993

[30] Foreign Application Priority Data

Jul. 18, 1991 [GB] United Kingdom ............... 9115538

[51] Int. Cl.⁶ .................................................. G01C 19/68
[52] U.S. Cl. ............................................................ 356/350
[58] Field of Search ................................................ 356/350

[56] References Cited

U.S. PATENT DOCUMENTS 4,968,136 11/1990 Lim et al. .................. 356/350

FOREIGN PATENT DOCUMENTS 2185147 7/1987 United Kingdom .

*Primary Examiner*—Vincent P. McGraw
*Attorney, Agent, or Firm*—Nixon & Vanderhye

[57] ABSTRACT

A navigation system comprising an RLG (6), means for inducing an oscillatory phase change in the output of the laser of the RLG which simulates an oscillatory dither whose amplitude is in excess of the sum of a defined lock-in range and a defined, narrower control zone, and means (3) for activating said oscillatory dither when the rotation rate applied to said RLG is within said control zone but to apply to the laser output a dither fixed at its full amplitude in the sense of the rotation rate applied to the RLG whenever said rotation rate is outside said defined control zone. Means (9) are preferably provided for applying to the laser output a dither output fixed at its full amplitude in the opposite sense and for the same period as a fixed dither output has previously been applied, provided that the applied rate is not outside said control zone in the original sense. The invention preferably includes means for reinstating oscillatory dither when the applied rate exceeds a higher control rate limit defined in both senses of rotation.

6 Claims, 3 Drawing Sheets

DITHER GENERATION FOR RING LASER GYROSCOPES

This invention relates to the application of dither to ring laser gyroscopes (RLGs) in order to overcome shortcomings in methods hitherto proposed for the purpose.

Mechanical dither is an established technique for the removal of the errors present in conventional RLGs due to the lock-in effect at low rotation rates. The technique consists of the application of an oscillatory rotation of the RLG assembly about an axis perpendicular to the lasing plane (which is the plane in which the RLG is sensitive to rotation) with an amplitude sufficient to provide angular rates which exceed the maximum rates which in the particular application may be applied to the RLG.

Thus, with a typical oscillatory frequency in the region of 400 Hz, the nett rate seen by the RLG moves through the lock-in range of, typically, 1° to 2° per second fairly rapidly so that only very small non-linearity errors remain. The technique has the very significant advantage that no angular position bias can directly result from the applied dither.

There are, however, a number of disadvantages. Firstly, the dither motion applied to the RLG results in a sinusoidal error signal superimposed on the RLG output. This necessitates continuous compensation by optical or electronic means or navigation limitations with rate updates only over integral dither cycles.

Secondly, instantaneous operation of the RLG from switch-on is no longer possible since the mechanically resonant dither takes some time to build up.

Thirdly, the dither motion is transmitted to other navigation sensors and to other instrumentation, particularly if the host vehicle is light and freely suspended, as in satellite applications. This motion produces errors and an audible sound which may be unacceptable in covert submarine navigation.

Since RLGs operate by the monitoring of the phase variation in the output of a ring laser, then in principle the equivalent of a mechanical dither superimposing a mechanical sinusoidal oscillation on the RLG can be produced by the application of a sinusoidal phase variation to the laser output.

One method of achieving such an optical dither is to subject one of the non-transmitting mirrors of the RLG to a transverse Kerr effect; by this means, the application of a sinusoidal electric current through an electromagnet induces a corresponding phase variation in the reflected light. The phase variation is not sinusoidal; because of a hysteresis effect, the magnetisation of the electromagnet remains close to a saturation value for a longer part of the cycle than would be in the case of a sine wave and the magnetisation and hence the phase variation tends towards a square wave function. In practice this is advantageous since the time period in which the superimposed dither value is close to zero (and does not therefore assist in the avoidance of lock-in) is a smaller proportion of the dither cycle.

The potential effect of this is limited by the saturation values achievable in the material of the field-directing pole pieces of the magnet, and in the present state of development of magnetic mirrors a direct replacement of mechanical dither by optical dither is not possible. Thus, if a generous ±10° per sec is allowed for the lock-in range and the system is specified to 120° per sec, the simulated dither amplitude needs to exceed ±130° per sec.

This invention consists of a navigation system comprising a RLG, characterised by including: means for inducing an oscillatory phase change in the output of the laser which simulates a oscillatory dither whose amplitude is in excess of the sum of a defined lock-in range and a defined, narrower control zone; and means for activating said oscillatory dither when the rotation rate applied to said RLG is within said control zone but to apply to the laser output a dither fixed at its full amplitude in the sense of the rotation rate applied to the RLG whenever said rotation rate is outside said defined control zone.

It is a relatively straightforward matter to compensate for the simulated rotation applied by the induced phase change in the output of the laser by applying a corresponding and opposite signal to the RLG which as a result indicates the real applied rotation rate.

The invention takes advantage of the fact that only during a small portion of its flight will the angular movement of a host vehicle such as a civil or military aircraft exceed a small value. This can be seen in FIG. 1 of the drawings, which is a histogram of the roll, pitch and yaw motions of a BAG-111 aircraft taken at one second intervals during a flight trial exceeding one hour. The 1° per sec figure, within which the aircraft is seen to fly for 85 to 90% of its flight time, compares with the aforesaid lock-in rate of 1° to 2° per sec.

For most of the time, therefore, a continuously-alternating phase change with a value equivalent to perhaps 15° per sec is induced in alternating senses where the lock-in zone is defined as ±10° per sec, but when the rate applied to the RLG exceeds a defined value of, perhaps, 2° per sec, the phase change is held at 15° per sec in the sense of the applied rotation. This value is within the capabilities of current technology.

A potential drawback for this technique is that there is no inherent avoidance of directional dither bias as there is with a mechanical arrangement which results in oscillation about a defined datum. In a preferred embodiment, therefore, the invention incorporates means for applying to the laser, as soon as the rate applied to the RLG re-enters the defined, narrower control zone, a phase shift at the same amplitude, in the opposite sense and for the same period as a phase shift, previously applied, provided that the applied rate does not depart from the control zone in the original sense.

Said means conveniently comprises a reversible counter applied between the output of the RLG and the means for inducing the oscillatory phase change in the output of the laser.

In a further embodiment of the invention, higher control limits in both senses of rotation are defined and means are provided for reinstating oscillatory dither when the applied rate is above said control limits.

An advantage of this embodiment is that errors due to inequalities between the two dither states are minimised; these errors are proportional to the total induced phase shift and whereas in the first embodiment this phase shift continuously increases while the applied rate remains to one side of the control zone, in the further embodiment the phase shift only increases whilst the applied rate remains between the two control limits on the same side of zero.

As an illustration, since if a variation of only $10^{-6}$ difference exists between the magnitude of the two dither states, then for a dither of ±100° per sec, a rate bias of $0.5 \times 10^{-6} \times 100°$ per sec, i.e. 0·2° per hour, will result. In a case where dither is not activated when the applied rate exceeds 2° per sec, and the amplitude of the dither is limited to 15° per sec, a postulated switching level difference of $10^{-6}$ would generate a bias of only 0·03° per hour.

In this embodiment, means can be provided for applying to the laser output a dither output fixed at its full amplitude in the opposite sense and for the same period as a fixed dither output has previously been applied provided that the applied rate is not between the two control limits in the original sense. By this means, the phase shift will start to decrease as soon as the applied rate exceeds the higher control limit.

By way of example, one embodiment of the invention will now be described with reference to FIGS. 2 to 6 of the drawings, of which FIG. 2 is a schematic block diagram of a circuit for applying electronic dither to a RLG in accordance with the invention;

Figure 5:
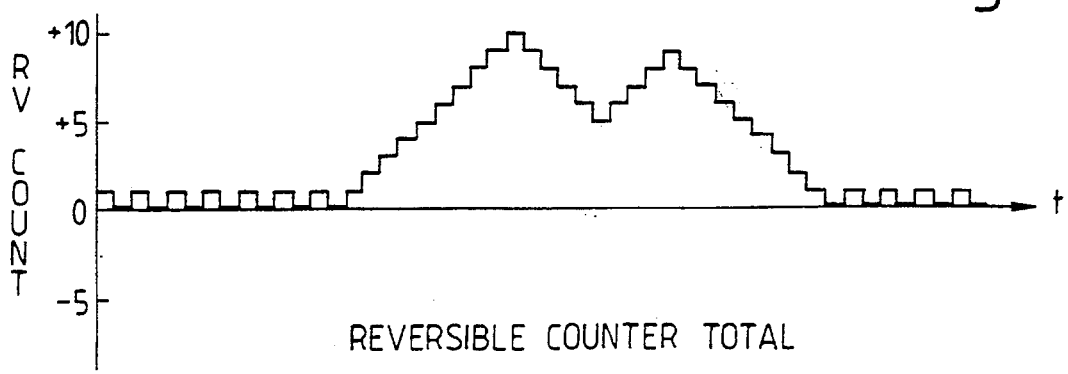

FIG. 5 indicates the corresponding cumulative dither count; and

Figure 6:
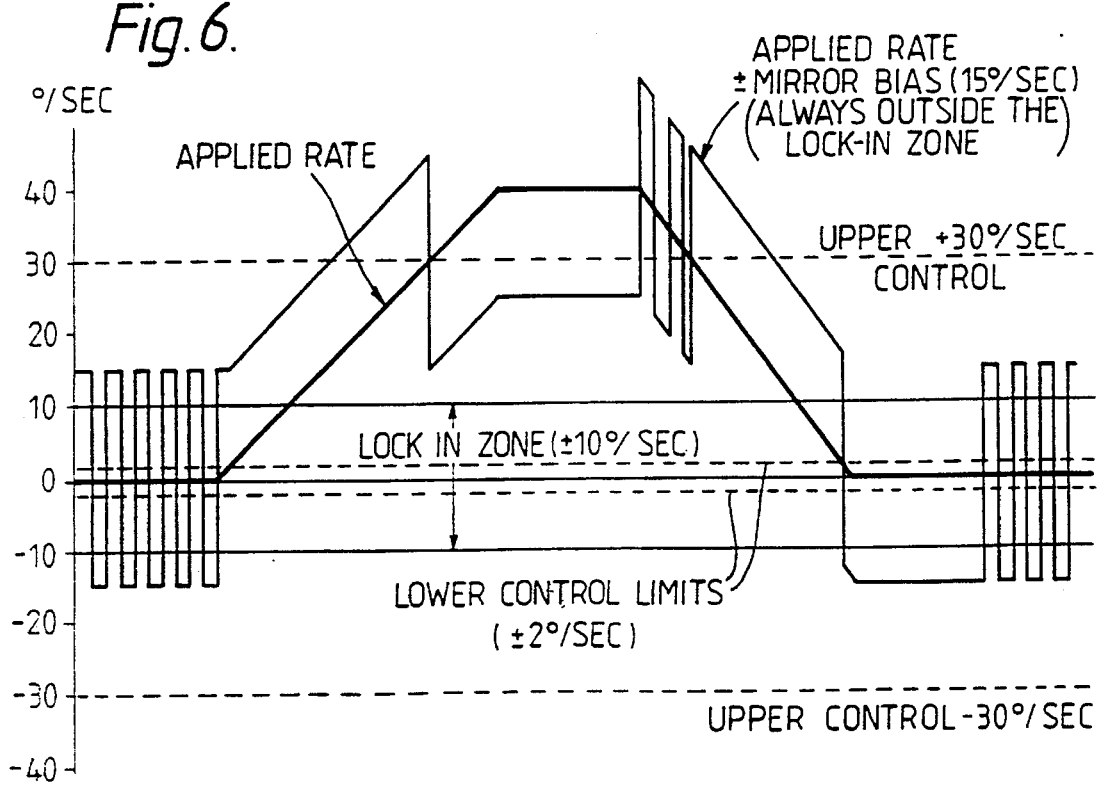
Figure 3:
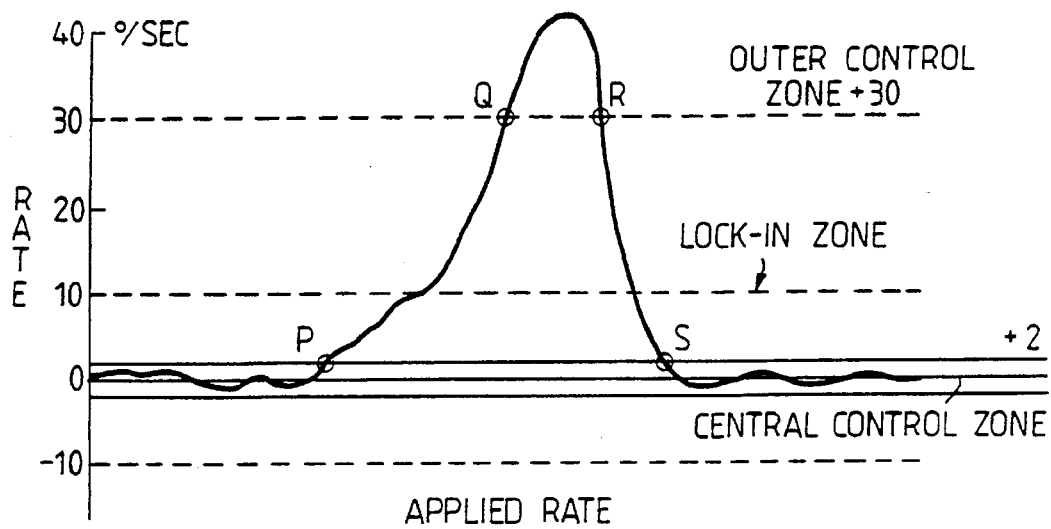
FIG. 3 is an example of the rotation rate of a host vehicle relative to various rate limits defined by the invention.

FIG. 6 illustrates the result of the superimposition of dither and applied rate to a sample of motion similar to that shown in FIG. 3.

Figure 1:
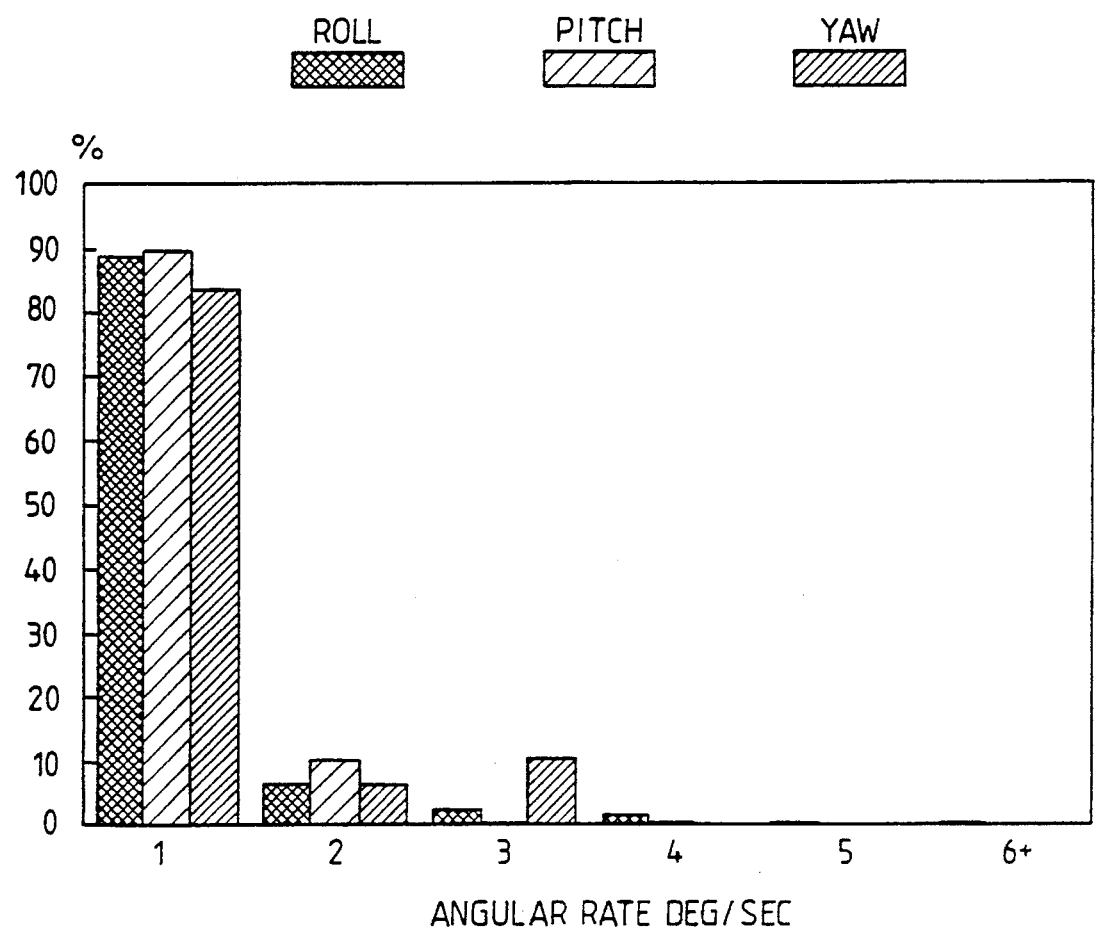
Figure 2:
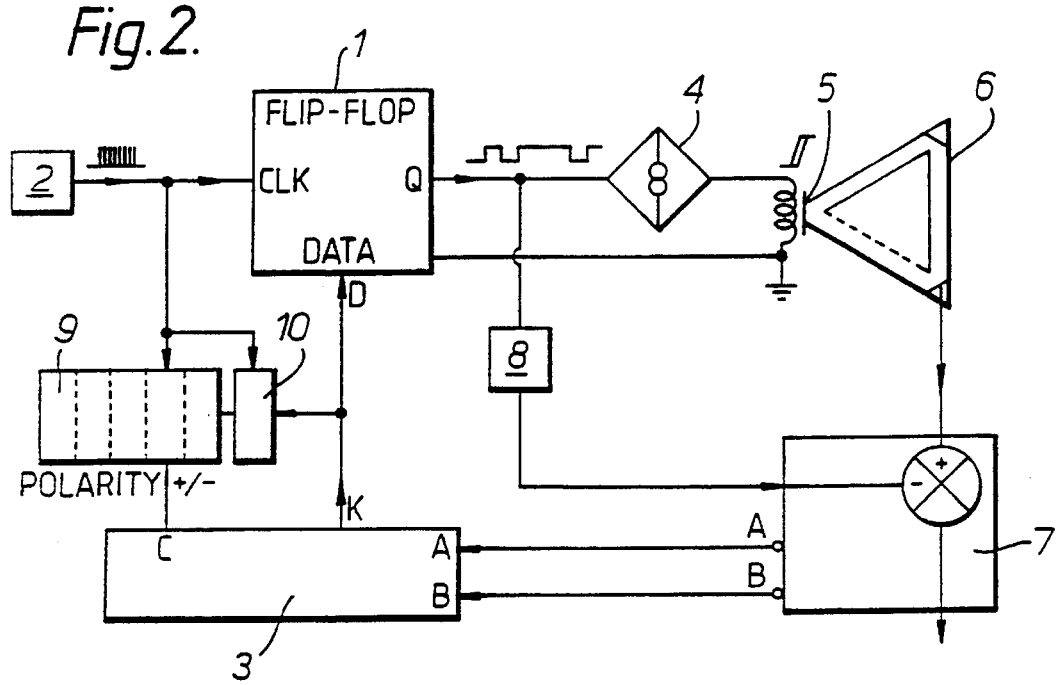

With reference to FIG. 2, the circuit consists of a D-type flip-flop 1 the polarity of whose output at each pulse of a 1·6 kHz clock 2 is determined by an input from a control logic circuit 3. The output of the flip-flop as applied to a pulse generator 4 sets the direction of a control pulse applied to a magnetic mirror 5 incorporated in one of the non-transmitting mirrors of an RLG 6.

The output of the RLG, which is applied to a convertor 7 which translates the output into a rotation rate value, directly indicates the sum of the rotation rate of the host vehicle (the applied rate) and the dither rate, but the latter can be subtracted from this by applying the output of an electronic compensator 8 determined by the current dither condition. The final output thus represents the true applied rotation rate with no superimposed dither. This is a highly desirable condition since it not only increases navigation accuracy but it also allows the signal to be available for flight control.

The operation of the control logic circuit is determined by an output of the convertor which is dependent on the applied rate, and also by a reversible counter 9 which is driven by the clock 2. The output from the convertor is applied to two inputs A and B of the control logic, and the logic states of A and B are determined by whether the applied rate is within the range of 2° to 30° per sec in one or other sense as follows:

Input A: logic state 0 if 2<A<30 (°/s) otherwise logic state 1

Input B: logic state 0 if −2>B>−30 otherwise logic state 1

The above logic states therefore define control zones, i.e. when the applied rate is outside the range of −2° to 30° per sec in either sense, in which the logic states are 0.

The output C to the control logic circuit from the reversible counter is controlled by a 4-bit up/down counter 10 which is connected to the output D from the control logic circuit to the flip-flop 1. When the measured applied rate is within the defined control range, so that logic states A and B are both 1, then the output from the reversible counter reverses with each reversal of the 4-bit counter, with the result that alternating pulses are applied to the flip-flop 1.

When the rate is outside the control zones (i.e. if the measured applied rate is in the range of 2° to 30° per sec in either sense), then the control logic circuit is set to override the output of the reversible counter and to apply a high or low state to the flip-flop as determined by the sense of the applied rate. During that period, a count pulse accumulates, but this is servo-clocked back down to zero once the rate enters one of the control zones again.

truth table for the control logic can therefore be expressed as follows:

| A | B | C | D |
|---|---|---|---|
| 0 | 1 | X | 1 |
| 1 | 0 | X | 0 |
| 1 | 1 | 1 | 0 |
| 1 | 1 | 0 | 1 |

The clock period needs to be kept as short as possible (less than 1 mS) so that a rapid response is available from the control logic to reset the dither state. This ensures that high angular acceleration rates can be accommodated without error. At the same time, the oscillatory dither frequency should be kept low (100 Hz or so) in order to minimise the number of times that the lock-in threshold is crossed.

The conflict between these two requirements is resolved by a functional separation of the 4-bit up/down counter 10 from the reversible counter 9; thus the 4-bit counter 10 operates at the 1·6 kHz clock frequency and can respond to changes in applied rate within a correspondingly short time. The "normal" dither frequency is however governed by the reversible counter which is clocked 16 times slower, viz at 100 Hz.

The time periods during which the count pulse is allowed to accumulate is limited by the operation of the upper control limits, and counter control is reactivated for applied rates exceeding, by a set margin, the sum of the defined lock-in threshold and dither values. For example, a postulated lock-in range of ±10° per sec and dither of ±15° per sec permits dither control to be reactivated at ±30° per sec. In consequence, only the 2° to 30° per sec range is time-constrained in testing and use.

The result of this is that while the applied rate is within the control zones, dither as controlled by the repeated reversing of the counter is in operation. When the rate passes out of the control zones (in this case by entering the range of 2° to 30° per sec in either direction), then the optical bias is held on (in the same direction as the applied rate) so that the nett rate sensed by the RLG is well above the threshold limits. When the rate re-enters a control zone, the optical bias is switched to the opposite direction and remains there for the same period that it was set in the first direction, provided that the rate remains in that control zone.

Figure 4:
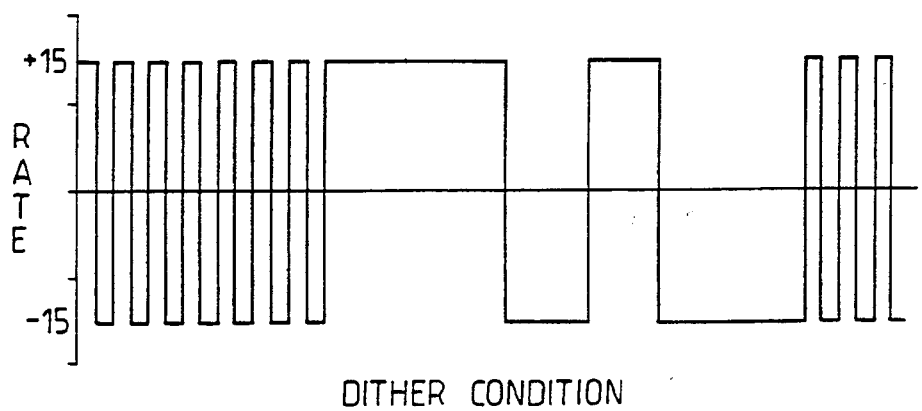
FIG. 4 shows the dither condition applied to said rate.

This is further illustrated in FIGS. 3, 4 and 5.

FIG. 3 shows a rate/time profile of a fictitious flight which includes a turn during a flight in which the rate is otherwise within a ±2° per sec limit in either direction. Also shown in the Figure is a defined lock-in zone of ±10° per sec, which is a necessarily generous allowance since lock-in is likely to occur only at rather smaller rates, and an upper control zone indicator at 30° per sec.

As shown in FIG. 4, the dither operates in a standard oscillating mode equating to a ±15° per sec rate oscillation until the applied rate exceeds the ±2° per sec threshold whereupon the dither is set to a fixed value in the same sense as the applied rate.

If the 30° per sec rate is exceeded, and the system enters the outer control zone, or else the rate drops again below 2° per sec, the reversible counter is allowed to regain control, and in this case the dither state is reversed for the same time that the initial set rate was held, after which oscillatory dither re-commences. When the applied rate drops to ±30° per sec again, or again exceeds ±2° per sec, the set state is re-established high and remains so until either the 30° per sec rate is established again or the rate drops to the central control zone when the counter regains control.

FIG. 4 shows the dither condition corresponding to the rates illustrated in FIG. 3, and the effect of this on the total rotation superimposed by the dither effect, as seen by the RLG (essentially an integration of the FIG. 4 values), is seen in FIG. 5. Whilst in the control zones, the dither count oscillates at the zero value, but outside these zones, the zonal count steadily increases until the sense reverses. The decrease in count terminates at the zero value when oscillation re-commences.

Provided that the optical bias switching levels are symmetrical, there is therefore no error introduced since the timing periods have been equalised.

As a further illustration of how the application of set and oscillatory dither values enable the rate as seen by the RLG to avoid the lock-in zone. FIG. 6 superimposes a nett rate on a notional applied rate plotted against time and indicates also the control zones and a lock-in zone fixed at ±10° per sec. To avoid the lock-in zone using conventional, continuous dither (mechanical or optical) the amplitude of the dither would need to exceed the expected maximum applied rate by at least 10° per sec; thus if an aircraft inertial navigation system is specified for up to 100° per sec then the RLG would have to operate accurately up to that figure and hence the dither amplitude would have to exceed 110° per sec.

This embodiment thus allows operation of any continuous rate (such as on the roll axis of a missile) outside a narrow band.

By use of this invention, the maximum rate specification of the system does not affect the required dither amplitude and hence a value can be utilised which is within the capabilities of current technology.

I claim:

1. A navigation system including a ring laser gyroscope (RLG) incorporating a laser, comprising:

means for inducing an oscillatory phase change in the laser which creates an effect of an oscillatory dither whose amplitude is in excess of the sum of a defined lock-in range and a defined, narrower, lower control zone; and means for activating said oscillatory phase change when the rotation rate applied to said RLG is within said defined, narrower, lower control zone and applying to the laser a phase shift fixed at full amplitude in said oscillatory phase change in the sense of the rotation rate applied to the RLG whenever the rotation rate is outside said defined, narrower, lower control zone.

2. A navigation system as claimed in claim 1 including means for applying a signal to the RLG to compensate for the applied phase change in the laser.

3. A navigation system as claimed in claim 1 including means for applying to the laser as soon as the rotation rate applied to the RLG re-enters said defined, narrower, lower control zone, a phase shift at the same amplitude, in the opposite sense and for the same period as a phase shift previously applied, provided that the rotation rate applied to the RLG does not depart from said defined, narrower, lower control zone in the original sense.

4. A navigation system as claimed in claim 3 in which said means for applying a phase shift to the laser comprises a reversible counter applied between the output of the RLG and the means for inducing the oscillatory phase change in the laser.

5. A navigation system as claimed in claim 1 including means for reactivating oscillatory phase change in the laser when the rotation rate applied to the RLG exceeds an upper control rate defined in both senses of rotation.

6. A navigation system as claimed in claim 5 including means for applying to the laser, as soon as the rotation rate applied to the RLG re-enters said defined, lower, narrower, lower control zone, a phase change fixed at full amplitude in the opposite sense and for the same period as a fixed phase change previously applied provided that the rotation rate applied to the RLG is not between said defined, narrower, lower zone and said upper control rate in the previous sense.

* * * * *